(12) United States Patent
Liu et al.

(10) Patent No.: US 11,130,501 B2
(45) Date of Patent: Sep. 28, 2021

(54) SYSTEM, METHOD AND APPARATUS FOR CONTROLLING AUTONOMOUS DRIVING VEHICLE

(71) Applicant: Baidu Online Network Technology (Beijing) Co., Ltd., Beijing (CN)

(72) Inventors: Ronghong Liu, Beijing (CN); Jiangyuan Sun, Beijing (CN); Qin Yan, Beijing (CN); Zijian Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 263 days.

(21) Appl. No.: 16/025,310

(22) Filed: Jul. 2, 2018

(65) Prior Publication Data

US 2019/0009797 A1   Jan. 10, 2019

(30) Foreign Application Priority Data

Jul. 4, 2017  (CN) .......................... 201710538079.7

(51) Int. Cl.
*B60W 50/14* (2020.01)
*G05D 1/00* (2006.01)

(52) U.S. Cl.
CPC ........... *B60W 50/14* (2013.01); *G05D 1/0061* (2013.01); *G05D 1/0077* (2013.01);
(Continued)

(58) Field of Classification Search
CPC ........... B60W 50/14; B60W 2050/143; B60W 2420/52; B60W 2420/42; B60W 2050/0215; B60W 50/0225; B60W 2050/0292; B60W 60/0053; B60W 30/143; B60W 50/10; B60W 50/029;
(Continued)

(56) References Cited

U.S. PATENT DOCUMENTS 4,706,198 A * 11/1987 Thurman ............. G08G 5/0013
                                                     701/120
5,019,759 A *  5/1991 Takemura ............ B60N 2/0244
                                                     307/10.1
(Continued)

FOREIGN PATENT DOCUMENTS

AU      2013256375 A1 * 11/2014 .......... G05D 1/0291
CN         1746801 A      3/2006
(Continued)

*Primary Examiner* — Behrang Badii
*Assistant Examiner* — Jalal C Coduroglu
(74) *Attorney, Agent, or Firm* — Nixon Peabody LLP

(57) ABSTRACT

The present disclosure discloses a system, method and apparatus for controlling an autonomous driving vehicle. A specific embodiment of the method comprises: periodically sending a heartbeat signal and/or communication data to a master control terminal device to determine whether the master control terminal device fails; and in response to determining a failure of the master control terminal device, acquiring data collected by a standby sensor, analyzing the data to generate a control instruction, and sending the generated control instruction to an electronic controller to enable the electronic controller to control the autonomous driving vehicle. The implementation improves the reliability of the autonomous driving vehicle.

15 Claims, 4 Drawing Sheets

(52) U.S. Cl.
CPC ... *B60W 2050/143* (2013.01); *B60W 2420/42* (2013.01); *B60W 2420/52* (2013.01); *G05D 2201/0213* (2013.01)

(58) Field of Classification Search
CPC ......... B60W 50/0205; B60W 2554/00; B60W 2555/60; B60W 2710/06; B60W 2710/18; B60W 2710/20; B60W 2540/00; B60W 50/16; B60W 30/182; B60W 10/20; B60W 10/18; B60W 10/06; G05D 1/0077; G05D 1/0061; G05D 2201/0213
See application file for complete search history.

(56) References Cited

U.S. PATENT DOCUMENTS

| | | | | |
|---|---|---|---|---|
| 5,646,845 | A * | 7/1997 | Gudat | G05D 1/0297 701/41 |
| 5,928,294 | A * | 7/1999 | Zelinkovsky | G05D 1/0265 180/168 |
| 7,124,027 | B1 * | 10/2006 | Ernst, Jr. | G01S 13/931 701/301 |
| 8,182,396 | B2 * | 5/2012 | Martin | B60W 10/11 477/110 |
| 8,505,086 | B2 * | 8/2013 | Norman | H04L 63/0227 726/11 |
| 8,612,051 | B2 * | 12/2013 | Norman | H04L 63/0428 700/248 |
| 8,845,490 | B2 * | 9/2014 | Chan | B60W 10/11 477/110 |
| 9,235,212 | B2 * | 1/2016 | Bruemmer | G06N 7/005 |
| 9,335,163 | B2 * | 5/2016 | Lavoie | B60W 30/18036 |
| 9,513,103 | B2 * | 12/2016 | Crossman | B62D 15/027 |
| 9,552,503 | B2 * | 1/2017 | Bruemmer | G06K 7/10306 |
| 9,616,896 | B1 * | 4/2017 | Letwin | A61B 5/6893 340/576 |
| 9,875,440 | B1 * | 1/2018 | Commons | G06N 3/08 |
| 10,228,698 | B2 * | 3/2019 | Mimura | G08G 5/006 |
| 10,452,074 | B2 * | 10/2019 | Luo | G01C 21/00 700/248 |
| 10,625,732 | B2 * | 4/2020 | Kim | A61B 5/18 |
| 2003/0187569 | A1 * | 10/2003 | Iwagami | F02D 41/266 701/114 |
| 2004/0102219 | A1 * | 5/2004 | Bunton | H04W 88/085 455/560 |
| 2005/0080529 | A1 * | 4/2005 | Hashimoto | G06F 11/0757 701/36 |
| 2005/0276114 | A1 * | 12/2005 | Tsunekazu | G06F 13/385 365/185.22 |
| 2008/0263628 | A1 * | 10/2008 | Norman | H04L 63/0227 726/1 |
| 2008/0269949 | A1 * | 10/2008 | Norman | H04L 63/0227 700/248 |
| 2011/0195816 | A1 * | 8/2011 | Martin | B60W 10/06 477/115 |
| 2013/0030663 | A1 * | 1/2013 | Chan | B60W 30/18181 701/54 |
| 2014/0035725 | A1 * | 2/2014 | Bruemmer | G05D 1/0274 340/8.1 |
| 2014/0052293 | A1 * | 2/2014 | Bruemmer | G06N 7/005 700/248 |
| 2014/0139341 | A1 * | 5/2014 | Green | A61B 5/6893 340/576 |
| 2014/0358353 | A1 * | 12/2014 | Ibanez-Guzman | G05D 1/0027 701/23 |
| 2015/0006005 | A1 * | 1/2015 | Yu | G06Q 50/28 701/22 |
| 2015/0120124 | A1 * | 4/2015 | Bartels | B60W 50/14 701/23 |
| 2015/0134178 | A1 * | 5/2015 | Minoiu-Enache | B60W 50/035 701/23 |
| 2015/0256355 | A1 * | 9/2015 | Pera | H04L 12/2803 700/90 |
| 2015/0314785 | A1 * | 11/2015 | Kwon | B60Q 9/00 701/23 |
| 2015/0348335 | A1 * | 12/2015 | Ramanujam | G05D 1/0088 701/23 |
| 2016/0202702 | A1 * | 7/2016 | Bruemmer | G05D 1/0088 700/255 |
| 2016/0334789 | A1 * | 11/2016 | Park | G05D 1/0212 |
| 2016/0358475 | A1 * | 12/2016 | Prokhorov | H04L 63/0428 700/248 |
| 2017/0017239 | A1 * | 1/2017 | Kanai | A01B 39/00 |
| 2017/0038775 | A1 * | 2/2017 | Park | B60W 30/146 700/20 |
| 2017/0102700 | A1 * | 4/2017 | Kozak | G06F 13/385 365/185.22 |
| 2017/0123421 | A1 * | 5/2017 | Kentley | E06B 9/68 160/7 |
| 2017/0142766 | A1 * | 5/2017 | Kim | H04W 48/20 |
| 2017/0223712 | A1 * | 8/2017 | Stephens | H04M 11/002 379/106.01 |
| 2017/0233004 | A1 * | 8/2017 | Hatano | B62D 6/002 701/41 |
| 2017/0236210 | A1 * | 8/2017 | Kumar | H04R 3/04 |
| 2017/0244472 | A1 * | 8/2017 | Saito | B60K 28/066 |
| 2018/0020411 | A1 * | 1/2018 | Itagaki | H04L 27/2276 370/215 |
| 2018/0084523 | A1 * | 3/2018 | Uchiyama | B64C 25/50 701/120 |
| 2018/0137266 | A1 * | 5/2018 | Kim | B64C 25/50 244/50 |
| 2018/0170388 | A1 * | 6/2018 | Shin | G01C 21/3602 706/26 |
| 2018/0224851 | A1 * | 8/2018 | Park | G07C 5/008 |
| 2018/0290729 | A1 * | 10/2018 | Shavit | B64C 13/22 |
| 2018/0345988 | A1 * | 12/2018 | Mimura | B60W 50/082 |
| 2018/0373250 | A1 * | 12/2018 | Nakamura | G08G 5/0013 |
| 2019/0009797 | A1 * | 1/2019 | Liu | H02K 29/06 |
| 2019/0025817 | A1 * | 1/2019 | Mattingly | A61B 5/0205 |
| 2019/0061745 | A1 * | 2/2019 | Hatano | B64C 13/02 |
| 2019/0074751 | A1 * | 3/2019 | Chen | H02K 29/06 |
| 2019/0106118 | A1 * | 4/2019 | Asakura | A61B 5/18 |
| 2019/0143813 | A1 * | 5/2019 | Ono | B60W 10/08 |
| 2019/0265694 | A1 * | 8/2019 | Chen | G08G 5/0052 |
| 2019/0265703 | A1 * | 8/2019 | Hicok | G06Q 50/30 |
| 2019/0271981 | A1 * | 9/2019 | Oba | B60K 28/066 |
| 2019/0300020 | A1 * | 10/2019 | Alexiou | H04R 3/04 |
| 2019/0324450 | A1 * | 10/2019 | Lurie | G05D 1/0274 340/8.1 |
| 2019/0332106 | A1 * | 10/2019 | Belloni Mourao | B60W 30/18181 701/54 |
| 2020/0047773 | A1 * | 2/2020 | Akaba | G08G 1/09 |
| 2020/0156651 | A1 * | 5/2020 | Golov | G05D 1/0077 |

FOREIGN PATENT DOCUMENTS

| | | | | |
|---|---|---|---|---|
| CN | 102122162 | B * | 6/2012 | ......... B60W 50/029 |
| CN | 103425553 | A | 12/2013 | |
| CN | 103847739 | A * | 6/2014 | ......... G05D 1/0291 |
| CN | 104685431 | A * | 6/2015 | ......... G05B 19/041 |
| CN | 104685432 | A * | 6/2015 | ......... G01C 21/00 |
| CN | 106354141 | A | 11/2016 | |
| CN | 109229102 | A * | 1/2019 | ......... B60W 50/14 |
| DE | 19849312 | A1 * | 5/1999 | ......... B60W 10/08 |
| EP | 0451887 | B1 * | 6/1995 | ......... F16H 61/0251 |
| KR | 100216089 | B1 * | 8/1999 | ......... B60W 10/06 |
| KR | 20140136150 | A * | 11/2014 | ......... G01C 21/00 |
| WO | WO-2011098922 | A2 * | 8/2011 | ......... B60W 10/06 |
| WO | WO-2013166093 | A1 * | 11/2013 | ......... G05D 1/0088 |
| WO | WO-2013166096 | A1 * | 11/2013 | ......... G01C 21/00 |

* cited by examiner

SYSTEM, METHOD AND APPARATUS FOR CONTROLLING AUTONOMOUS DRIVING VEHICLE

CROSS-REFERENCE TO RELATED APPLICATION

This application is related to and claims priority from Chinese Application No. 201710538079.7, filed on Jul. 4, 2017 and entitled "System, Method and Apparatus for Controlling Autonomous Driving Vehicle," the entire disclosure of which is hereby incorporated by reference.

TECHNICAL FIELD

The present disclosure relates to the technical field of computers, specifically to the technical field of Internet, and more specifically to a system, method and apparatus for controlling an autonomous driving vehicle.

BACKGROUND

An autonomous driving vehicle is a novel intelligent vehicle, also known as a "wheeled mobile robot", which collects, calculates and analyzes sensor data mainly through a vehicle-mounted terminal device, and combines Electronic Control Unit (ECU) (also known as an electronic controller) to realize full-automatic operation of the vehicle, thus achieving the purpose of autonomous driving of the vehicle.

However, when the autonomous driving vehicle is in an autonomous driving state, if the vehicle-mounted terminal device fails, the vehicle in the autonomous driving state cannot run normally. If manual takeover is impossible or the manual takeover is too late, there will be safety accidents, so that the problem of low reliability exists.

SUMMARY

An objective of embodiments of the present disclosure is to provide an improved system, method and apparatus for controlling an autonomous driving vehicle to solve the technical problem mentioned in the foregoing background section.

In a first aspect, the embodiment of the present disclosure provides a system for controlling an autonomous driving vehicle, and the system includes a master control terminal device, a standby terminal device, an electronic controller, a main sensor and a standby sensor; the master control terminal device processing data collected by the main sensor to generate a control instruction; the standby terminal device periodically sending a heartbeat signal and/or communication data to the master control terminal device to determine whether the master control terminal device fails, and in response to determining a failure of the master control terminal device, acquiring data collected by the standby sensor, and analyzing the data to generate a control instruction; and the electronic controller executing the control instruction to control the autonomous driving vehicle.

In some embodiments, the standby terminal device sends a restart instruction to the master control terminal device after the generated control instruction is sent to the electronic controller to enable the electronic controller to control the autonomous driving vehicle, and sends an alarm message for prompting a driver to manually drive the autonomous driving vehicle in response to determining a failure of the restart of the master control terminal device.

In some embodiments, the standby terminal device switches the autonomous driving vehicle from an automatic driving mode to a manual driving mode in response to detecting a response of the driver to the alarm message after the alarm message for prompting the driver to manually drive the autonomous driving vehicle is sent.

In some embodiments, the standby terminal device sends a deceleration instruction or a pull-over instruction to the electronic controller in response to not detecting the response of the driver to the alarm message after the alarm message for prompting the driver to manually drive the autonomous driving vehicle is sent.

In some embodiments, the main sensor includes a laser radar, a first millimeter wave radar and a first camera, and the standby sensor includes a second millimeter wave radar and a second camera.

In a second aspect, the embodiment of the present disclosure provides a method for controlling an autonomous driving vehicle, which is applied to the standby terminal device; the standby terminal device is in communication with the standby sensor, the master control terminal device and the electronic controller respectively; the master control terminal device is in communication with a main sensor and the electronic controller respectively, the master control terminal device is used for processing data collected by the main sensor to generate a control instruction; and the electronic controller is used for executing the control instruction to control the autonomous driving vehicle. The method includes: periodically sending a heartbeat signal and/or communication data to the master control terminal device to determine whether the master control terminal device fails; and in response to determining a failure of the master control terminal device, acquiring data collected by the standby sensor, analyzing the data to generate a control instruction, and sending the generated control instruction to the electronic controller to enable the electronic controller to control the autonomous driving vehicle.

In some embodiments, after the sending the generated control instruction to the electronic controller to enable the electronic controller to control the autonomous driving vehicle, the method further includes: sending a restart instruction to the master control terminal device; and sending an alarm message for prompting a driver to manually drive the autonomous driving vehicle in response to determining a failure of the restart of the master control terminal device.

In some embodiments, after the sending the alarm message for prompting the driver to manually drive the autonomous driving vehicle, the method further includes: switching the autonomous driving vehicle from an automatic driving mode to a manual driving mode in response to detecting a response of the driver to the alarm message.

In some embodiments, after the sending the alarm message for prompting the driver to manually drive the autonomous driving vehicle, the method further includes: sending a deceleration instruction or a pull-over instruction to the electronic controller in response to not detecting the response of the driver to the alarm message.

In some embodiments, the main sensor includes a laser radar, a first millimeter wave radar and a first camera, and the standby sensor includes a second millimeter wave radar and a second camera.

In a third aspect, the embodiment of the present disclosure provides an apparatus for controlling an autonomous driving vehicle, which is applied to the standby terminal device; the standby terminal device is in communication with the standby sensor, the master control terminal device and the electronic controller respectively; the master control terminal device is in communication with a main sensor and the electronic controller respectively, the master control terminal device is used for processing data collected by the main sensor to generate a control instruction; and the electronic controller is used for executing the control instruction so as to control the autonomous driving vehicle. The apparatus includes: a first sending unit, configured to periodically send a heartbeat signal and/or communication data to the master control terminal device to determine whether the master control terminal device fails; and a second sending unit, configured to, in response to determining a failure of the master control terminal device, acquire data collected by the standby sensor, analyze the data to generate a control instruction, and send the generated control instruction to the electronic controller to enable the electronic controller to control the autonomous driving vehicle.

In some embodiments, the apparatus further includes: a third sending unit, configured to send a restart instruction to the master control terminal device; and an alarm unit, configured to send an alarm message for prompting a driver to manually drive the autonomous driving vehicle in response to determining a failure of the restart of the master control terminal device.

In some embodiments, the apparatus further includes: a switching unit, configured to switch the autonomous driving vehicle from an automatic driving mode to a manual driving mode in response to detecting a response of the driver to the alarm message.

In some embodiments, the apparatus further includes: a fourth sending unit, configured to send a deceleration instruction or a pull-over instruction to the electronic controller in response to not detecting the response of the driver to the alarm message.

In some embodiments, the main sensor includes a laser radar, a first millimeter wave radar and a first camera, and the standby sensor includes a second millimeter wave radar and a second camera.

In a fourth aspect, the embodiments of the present disclosure provide a standby terminal device including: one or more processors, and a storage apparatus for storing one or more programs, wherein the one or more programs, when executed by the one or more processors, cause the one or more processors to implement the method according to any embodiment of the method for controlling the autonomous driving vehicle.

In a fifth aspect, the embodiments of the present disclosure provide a computer readable storage medium storing a computer program therein, wherein the program, when executed by a processor, implements the method according to any embodiment of the method for controlling the autonomous driving vehicle.

According to the system, method and device for controlling the autonomous driving vehicle, provided by the embodiments of the present disclosure, the standby terminal device periodically sends a heartbeat signal and/or communication data to the master control terminal device to determine whether the master control terminal device fails; then, in response to determining a failure of the master control terminal device, the standby terminal device acquires data collected by a standby sensor, analyzes the data to generate a control instruction, and sends the generated control instruction to an electronic controller; and finally, the electronic controller controls the autonomous driving vehicle. Therefore, whether the master control terminal device fails may be effectively monitored, the autonomous driving vehicle may be prevented from running abnormally when the master control terminal device fails, and the reliability and safety of the autonomous driving vehicle are improved.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
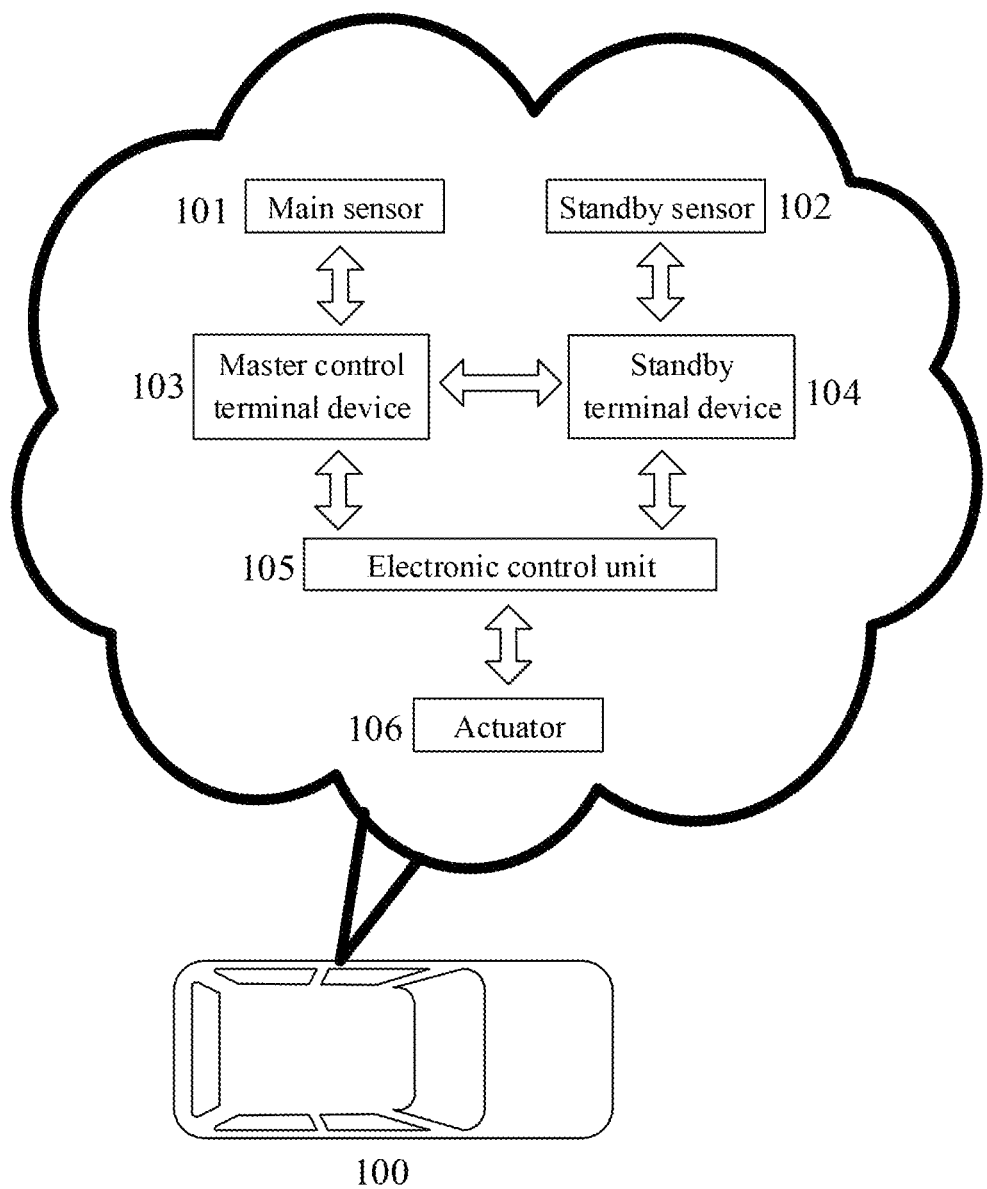
FIG. 1 is an architectural diagram of an exemplary system in which the present disclosure may be implemented.

FIG. 1 shows an exemplary architecture of a system 100 to which a system, method and apparatus for controlling the autonomous driving vehicle according to the present disclosure may be applied.

As shown in FIG. 1, an autonomous vehicle 100 may be equipped with a main sensor 101, a standby sensor 102, a master control terminal device 103, a standby terminal device 104, an electronic control unit (ECU) 105 and an actuator 106.

The main sensor 101 may be in communication with the master control terminal device 103, the standby sensor 102 may be in communication with the standby terminal device 104. The master control terminal device 103 and the standby terminal device 104 may be in communication with the electronic control unit 105, and the electronic control unit 105 may be in communication with the actuator 106. Here, the manner through which the master control terminal device 103 and the standby terminal device 104 connect the electronic control unit 105 may be a controller area network (CAN) bus connection. The high performance and reliability of the CAN bus have been widely recognized. Therefore, at present, a commonly used vehicle bus in motor vehicles is the CAN bus. Of course, it should be appreciated that the vehicle bus may also be other bus types.

The main sensor 101 may encompass various sensors, for example, including but not limited to, a laser radar, a millimeter wave radar, and a camera, etc. Here, the laser radar may be used for self-positioning, collecting a surrounding environment, and the like. The millimeter wave radar refers to a radar that is capable of operating in a millimeter wave band, and may be used for detecting an obstacle. The camera may be used for identifying traffic lights, traffic signs, and the like.

The standby sensor 102 may also encompass various sensors, for example, including but not limited to, a millimeter wave radar, and a camera, etc. The sensors included in the standby sensor 102 may be all or a part of the main sensor.

The master control terminal device 103 may be responsible for overall intelligent control of the whole autonomous vehicle. The master control terminal device 103 may be a stand-alone controller, such as a programmable logic controller (PLC), a microcontroller, or an industrial control machine, it may also be another equipment having I/O ports and composed of electronic components with a computing and controlling function, and it may also be a computer device including an installed vehicle driving control application. The master control terminal device 103 may acquire data collected by the main sensor 101, analyze and process the acquired data, make appropriate decisions, and send instructions matching the decisions to the electronic control unit.

The standby terminal device 104 may detect whether the master control terminal device 103 fails, and may be responsible for overall intelligent control of the whole autonomous vehicle when the master control terminal device 103 fails. The standby terminal device 104 may be a stand-alone controller, such as a programmable logic controller (PLC), a microcontroller, or an industrial control machine, it may also be another equipment having I/O ports and composed of electronic components with a computing and controlling function, and it may also be a computer device including an installed vehicle driving control application. The standby terminal device 104 may acquire data collected by the standby sensor 102, analyze and process the acquired data, make appropriate decisions, and send instructions matching the decisions to the electronic control unit.

The electronic control unit 105 may also be known as an electronic controller, a on-board brain or driving computer etc. It usually includes a microprocessor, a memory, an I/O interface, an A/D converter, and a large scale integration circuit, such as a shaping circuit and a driving circuit. The electronic control unit 105 may receive control instructions sent by the master control terminal device 103 and the standby terminal device 104, analyze and process the control instructions, and send the processed control instructions to a corresponding actuator 106 to execute corresponding operations.

In practice, the electronic control unit 105 may include controllers such as a vehicle control unit (VCU), a battery management system (BMS), a motor control unit (MCU), an electric power steering system (EPS), and an electronic stability program (ESP).

The actuator 106 may operate according to the control parameters in the control instructions. The actuator 106 may include a brake device, a throttle, an engine, and the like.

It should be noted that the method for controlling the autonomous driving vehicle applied to a standby terminal device according to the embodiments of the present disclosure is generally executed by the standby terminal device 104. Accordingly, the apparatus for controlling the autonomous driving vehicle is generally installed on the standby terminal device 104.

It should be appreciated that the numbers of the autonomous vehicle, the master control terminal device, the main sensor, the standby terminal device, the standby sensor, the electronic control unit and the actuator in FIG. 1 are merely illustrative. Any number of the autonomous vehicle, the master control terminal device, the main sensor, the standby terminal device, the standby sensor, the electronic control unit and the actuator may be provided based on the actual requirements.

Figure 2:
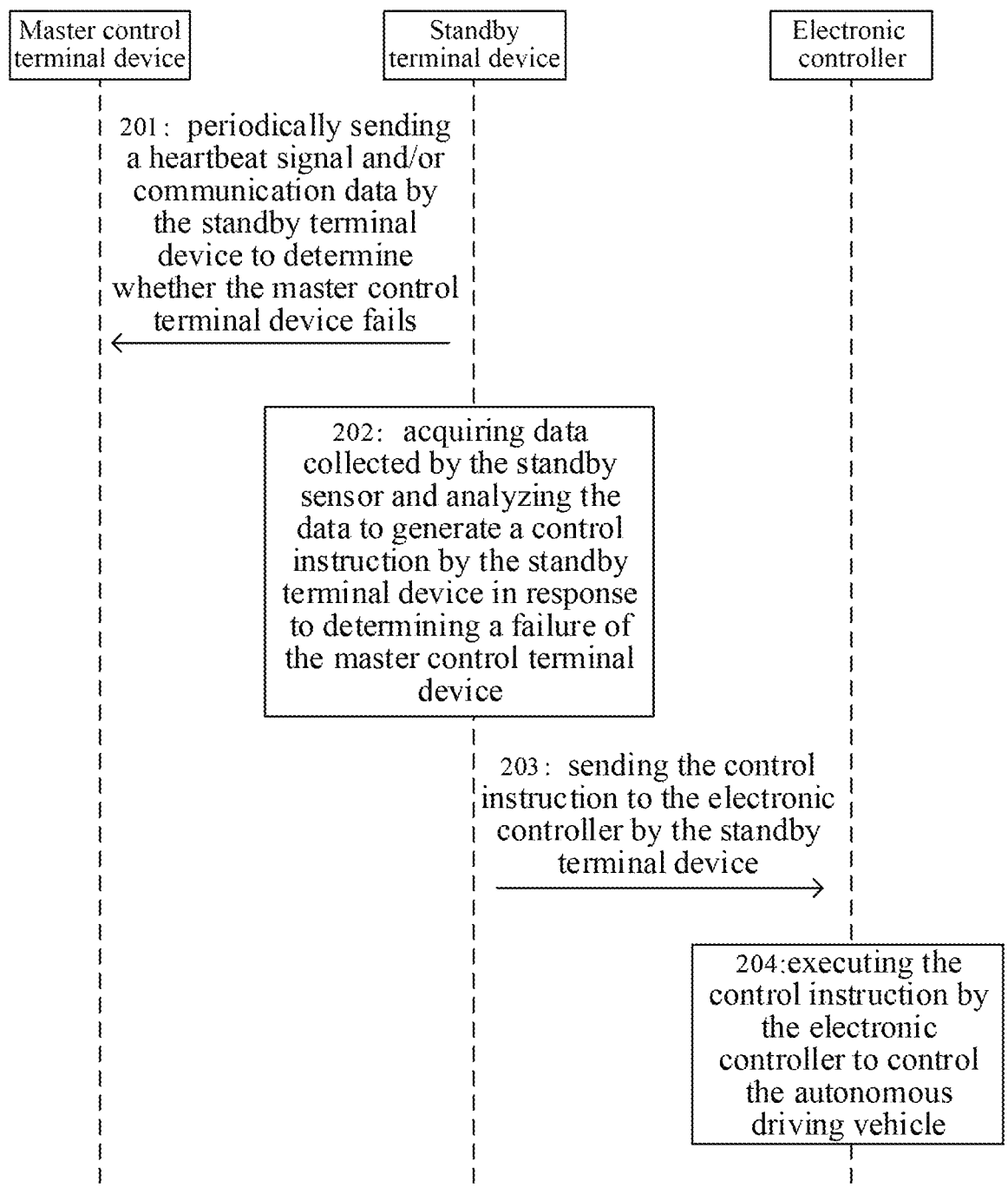
FIG. 2 is a schematic diagram of an interaction process between devices in the system for controlling the autonomous driving vehicle according to the present disclosure.

Further referring to FIG. 2, FIG. 2 shows a schematic diagram of an interaction process between devices in the system for controlling the autonomous driving vehicle according to an embodiment of the present disclosure.

The system for controlling the autonomous driving vehicle includes a master control terminal device, a standby terminal device, an electronic controller, a main sensor and a standby sensor. The master control terminal device processes data collected by the main sensor to generate a control instruction; the standby terminal device periodically sends a heartbeat signal and/or communication data to the master control terminal device to determine whether the master control terminal device fails, and in response to determining the failure of the master control terminal device, acquires data collected by the standby sensor, and analyzes the data to generate a control instruction; and the electronic controller executes the control instruction to control the autonomous driving vehicle.

As shown in FIG. 2, in the system for controlling the autonomous driving vehicle, the interaction process 200 between the devices may include the following steps.

Step 201, periodically sending a heartbeat signal and/or communication data to the master control terminal device by the standby terminal device to determine whether the master control terminal device fails.

In the present embodiment, when the autonomous driving vehicle is driving in an autonomous driving state, the master control terminal device (for example, the master control terminal device 103 shown in FIG. 1) may acquire data collected by the main sensor (for example, the main sensor 101 shown in FIG. 1) in real time, process the acquired data (for example, performing operational processing such as identification of roads, traffic lights, and obstacles) to generate a control instruction, and send the control instruction to the electronic controller which in turn controls the vehicle to realize operations such as steering, braking, accelerating, and backup. It should be noted that the interaction process between the master control terminal device and the electronic controller is not shown in the interaction process 200.

The standby terminal device (for example, the standby terminal device 104 shown in FIG. 1) may periodically send a heartbeat signal and/or communication data to the master control terminal device through CAN communication or vehicle-mounted Ethernet. The communication data may include road information (for example, straights, bends, etc.), vehicle information (for example, whether there is a vehicle within a certain range of a driving direction, etc.), driving state information (for example, an autonomous driving state and a manual driving state), etc. The standby terminal device may determine whether the master control terminal device fails through the response of the master control terminal device to the heartbeat signal and/or the feedback of the master control terminal device to the communication data.

In some optional implementations, the standby terminal device periodically sends a heartbeat signal to the master control terminal device. If the master control terminal device does not respond to the heartbeat signal, it may be determined that the master control terminal device fails; and if the master control terminal device responds to the heartbeat signal, it may be determined that the master control terminal device does not fail.

In some optional implementations, the standby terminal device periodically sends communication data to the master control terminal device. If the master control terminal device does not make a feedback to the communication data, it may be determined that the master control terminal device fails; and if the master control terminal device makes a feedback to the communication data, it may be determined that the master control terminal device does not fail.

In some optional implementations, the standby terminal device periodically sends a heartbeat signal and communication data to the master control terminal device. If the master control terminal device does not respond to the heartbeat signal or make a feedback to the communication data, it may be determined that the master control terminal device fails; and if the master control terminal device corresponds to the heartbeat signal and makes a feedback to the communication data, it may be determined that the master control terminal device does not fail.

Step 202, acquiring data collected by the standby sensor and analyzing the data to generate a control instruction by the standby terminal device in response to determining a failure of the master control terminal device.

In the present embodiment, the standby terminal device may acquire the data collected by the standby sensor (for example, the standby terminal device 102 shown in FIG. 1) and analyze the data to generate a control instruction in response to determining the failure of the master control terminal device. Specifically, after determining the failure of the master control terminal device, the standby terminal device may first extract current road information and vehicle information collected by the standby sensor, and then analyze the road information and the vehicle information to generate control instructions for maintaining the current vehicle speed, decelerating, pulling over or braking. As an example, if the road information indicates that the driving direction is a straight road, and the vehicle information indicates that there are no vehicles in each lane on the right side of the driving direction, a control instruction for pulling over may be generated. In practice, the control instruction may include various control parameters, such as a speed, a corner and the like.

Step 203, sending the control instruction to the electronic controller by the standby terminal device.

In the present embodiment, the standby terminal device may send the control instruction to the electronic controller after the control instruction is generated.

Step 204, executing the control instruction by the electronic controller to control the autonomous driving vehicle.

In the present embodiment, the electronic controller may execute the control instruction to control the autonomous driving vehicle. In practice, the electronic controller may be connected with a plurality of executive devices (for example, the executive device 106 shown in FIG. 1), and may enable the executive devices to work under control parameters in the control instruction. The executive device may include a braking device, an accelerator, an engine and the like.

According to the system provided by the above embodiment of the present disclosure, the standby terminal device periodically sends a heartbeat signal and/or communication data to the master control terminal device to determine whether the master control terminal device fails; then, in response to determining the failure of the master control terminal device, the standby terminal device acquires data collected by a standby sensor, analyzes the data to generate a control instruction, and sends the generated control instruction to an electronic controller; and finally, the electronic controller controls the autonomous driving vehicle. Therefore, whether the master control terminal device fails may be effectively monitored, the autonomous driving vehicle may be prevented from running abnormally when the master control terminal device fails, and the reliability and safety of the autonomous driving vehicle are improved.

Figure 3:
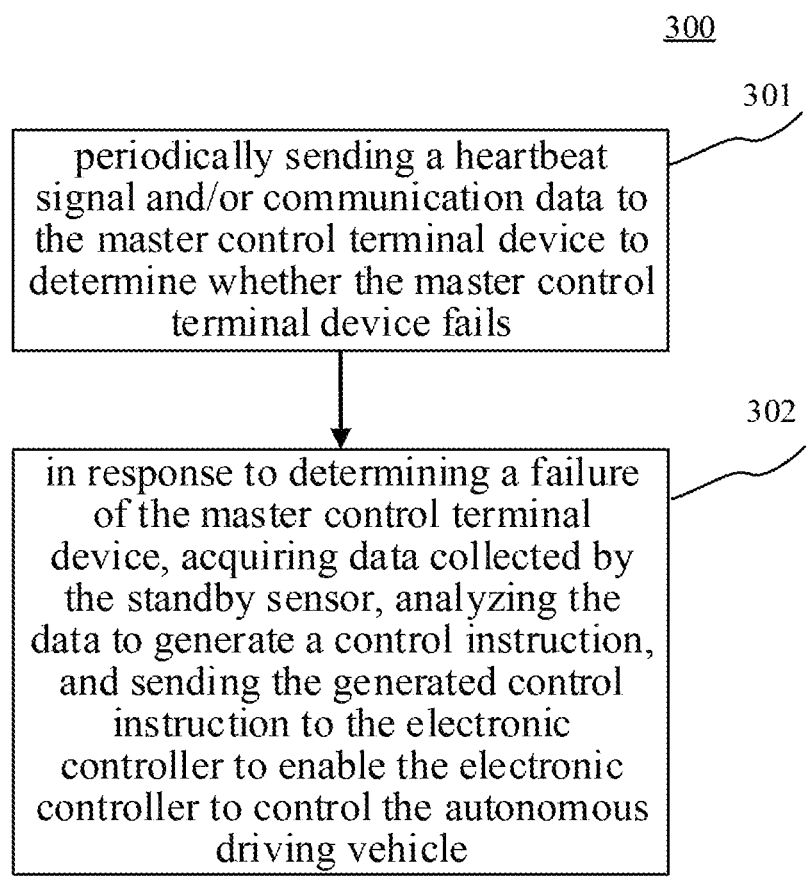
FIG. 3 is a flowchart diagram of a method for controlling the autonomous driving vehicle according to an embodiment of the present disclosure.

Further referring to FIG. 3, FIG. 3 shows a flow 300 of an embodiment of the method for controlling the autonomous driving vehicle, applied to the standby terminal device, according to the present disclosure. The standby terminal device is in communication with the standby sensor, the master control terminal device and the electronic controller respectively. The master control terminal device is in communication with the main sensor and the electronic controller respectively. The master control terminal device is used for processing data collected by the main sensor to generate a control instruction, the electronic controller is used for executing the control instruction to control the autonomous driving vehicle, and the method for controlling the autonomous driving vehicle includes the following steps.

Step 301, periodically sending a heartbeat signal and/or communication data to the master control terminal device to determine whether the master control terminal device fails.

In the present embodiment, an electronic device (for example, the standby terminal device 104 shown in FIG. 1) on which the method for controlling the autonomous driving vehicle is performed may periodically send a heartbeat signal and/or communication data to the master control terminal device through CAN communication or vehicle-mounted Ethernet. The communication data may include road information, vehicle information, driving state information, etc. The electronic device may determine whether the master control terminal device fails through the response of the master control terminal device to the heartbeat signal and/or the feedback of the master control terminal device to the communication data.

Step 302, in response to determining a failure of the master control terminal device, acquiring data collected by the standby sensor, analyzing the data to generate a control instruction, and sending the generated control instruction to the electronic controller to enable the electronic controller to control the autonomous driving vehicle.

In the present embodiment, the electronic device may first acquire the data (for example, road information, vehicle information, etc.) collected by the standby sensor (for example, the standby sensor 102 shown in FIG. 1) in response to determining the failure of the master control terminal device. Then, the data may be analyzed to generate control instructions for maintaining the current vehicle speed, decelerating, pulling over or braking. Finally, the generated control instructions may be sent to the electronic controller (for example, the electronic controller 105 shown in FIG. 1), to enable the electronic controller to control the autonomous driving vehicle.

It should be noted that the operations of the steps 301 and 302 are basically the same as those of the steps 201 to 204, and will not repeatedly described here.

In some optional implementations of the present embodiment, after the generated control instruction is sent to the electronic controller to enable the electronic controller to control the autonomous driving vehicle, the electronic controller may further send a restart instruction to the master control terminal device, and send an alarm message for prompting a driver to manually drive the autonomous driving vehicle in response to determining the failure of the restart of the master control terminal device. The alarm message may be voice prompt information or alarm sound for prompting the driver to manually drive the autonomous driving vehicle, and may also be alarm actions such as steering wheel shaking, vibration and the like.

In some optional implementations of the present embodiment, after the alarm message for prompting the driver to manually drive the autonomous driving vehicle is sent, the electronic device may switch the autonomous driving vehicle from an automatic driving mode to a manual driving mode in response to detecting a response (for example, an operation of turning off the alarm sound, an operation of holding the steering wheel with hands, etc.) of the driver to the alarm message.

In some optional implementations of the present embodiment, after the alarm message for prompting the driver to manually drive the autonomous driving vehicle is sent, the electronic device may send a deceleration instruction or a pull-over instruction to the electronic controller in response to not detecting the response of the driver to the alarm message. In practice, in the process of deceleration or pull-over of the autonomous driving vehicle, the electronic device may acquire the data collected by the standby sensor in real time, and adjust the sent control instruction in real time on the basis of road information and vehicle information involved in the data to ensure that obstacles and the like in the process of deceleration or pull-over are avoided.

In some optional implementations of the present embodiment, the main sensor may include but not limited to a laser radar, a first millimeter wave radar and a first camera, and the standby sensor may include but not limited to a second millimeter wave radar and a second camera.

According to the method provided by the above embodiment of the present disclosure, heartbeat signal and/or communication data are periodically sent to the master control terminal device to determine whether the master control terminal device fails; then, in response to determining the failure of the master control terminal device, the data collected by the standby sensor are acquired, and the data are analyzed to generate a control instruction; and the generated control instruction is sent to the electronic controller to enable the electronic controller to control the autonomous driving vehicle. Therefore, whether the master control terminal device fails may be effectively monitored, the autonomous driving vehicle may be prevented from running abnormally when the master control terminal device fails, and the reliability and safety of the autonomous driving vehicle are improved.

Figure 4:
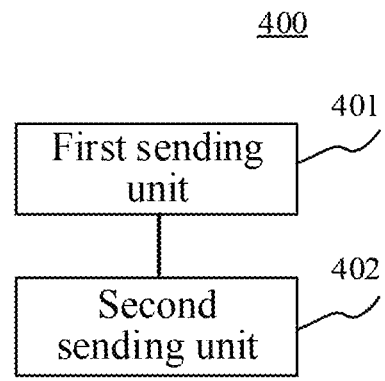
FIG. 4 is a schematic structural diagram of an apparatus for controlling the autonomous driving vehicle according to an embodiment of the present disclosure.

Further referring to FIG. 4, as implementation for the method shown in the above figures, the present disclosure provides an embodiment of an apparatus for controlling an autonomous driving vehicle, applied to a standby terminal device. The standby terminal device is in communication with a standby sensor, a master control terminal device and an electronic controller respectively. The master control terminal device is in communication with a main sensor and the electronic controller respectively. The master control terminal device is used for processing data collected by the main sensor so as to generate a control instruction, and the electronic controller is used for executing the control instruction to control the autonomous driving vehicle. The embodiment of the apparatus corresponds to the embodiment of the method shown in FIG. 3, and the apparatus may be specifically applied to the standby terminal device.

As shown in FIG. 4, the apparatus 400 for controlling the autonomous driving vehicle according to the present embodiment includes: a first sending unit 401, configured to periodically send a heartbeat signal and/or communication data to the master control terminal device to determine whether the master control terminal device fails; and a second sending unit, configured to, in response to determining a failure of the master control terminal device, acquire data collected by the standby sensor, analyze the data to generate a control instruction, and send the generated control instruction to the electronic controller to enable the electronic controller to control the autonomous driving vehicle.

In the present embodiment, the first sending unit 401 may periodically send the heartbeat signal and/or communication data to the master control terminal device through CAN communication or vehicle-mounted Ethernet. The communication data may include road information, vehicle information, driving state information, etc. The electronic device may determine whether the master control terminal device fails through a response of the master control terminal device to the heartbeat signal and/or a feedback of the master control terminal device to the communication data.

In the present embodiment, the second sending unit 402 may first acquire the data (for example, road information, vehicle information, etc.) collected by the standby sensor (for example, the standby sensor 102 shown in FIG. 1) in response to determining the failure of the master control terminal device. Then, the data may be analyzed to generate control instructions for maintaining the current vehicle speed, decelerating, pulling over or braking. Finally, the generated control instructions may be sent to the electronic controller (for example, the electronic controller 105 shown in FIG. 1), to enable the electronic controller to control the autonomous driving vehicle.

In some optional implementations of the present embodiment, the apparatus 400 for controlling the autonomous driving vehicle further includes a third sending unit and an alarm unit (not shown). The third sending unit may be configured to send a restart instruction to the master control terminal device. The alarm unit may be configured to send an alarm message for prompting a driver to manually drive the autonomous driving vehicle in response to determining a failure of the restart of the master control terminal device.

In some optional implementations of the present embodiment, the apparatus 400 for controlling the autonomous driving vehicle further includes a switching unit (not shown). The switching unit is configured to switch the autonomous driving vehicle from an automatic driving mode to a manual driving mode in response to detecting a response of the driver to the alarm message.

In some optional implementations of the present embodiment, the apparatus 400 for controlling the autonomous driving vehicle further includes a fourth sending unit (not shown). The fourth sending unit is configured to send a deceleration instruction or a pull-over instruction to the electronic controller in response to not detecting the response of the driver to the alarm message.

In some optional implementations of the present embodiment, the main sensor may include a laser radar, a first millimeter wave radar and a first camera, and the standby sensor may include a second millimeter wave radar and a second camera.

According to the apparatus provided by the above embodiment of the present disclosure, the first sending unit 401 periodically sends a heartbeat signal and/or communication data to the master control terminal device to determine whether the master control terminal device fails; then, in response to determining the failure of the master control terminal device, the second sending unit 402 acquires data collected by the standby sensor, analyzes the data to generate a control instruction, and sends the generated control instruction to the electronic controller to enable the electronic controller to control the autonomous driving vehicle. Therefore, whether the master control terminal device fails may be effectively monitored, the autonomous driving vehicle may be prevented from running abnormally when the master control terminal device fails, and the reliability and safety of the autonomous driving vehicle are improved.

Figure 5:
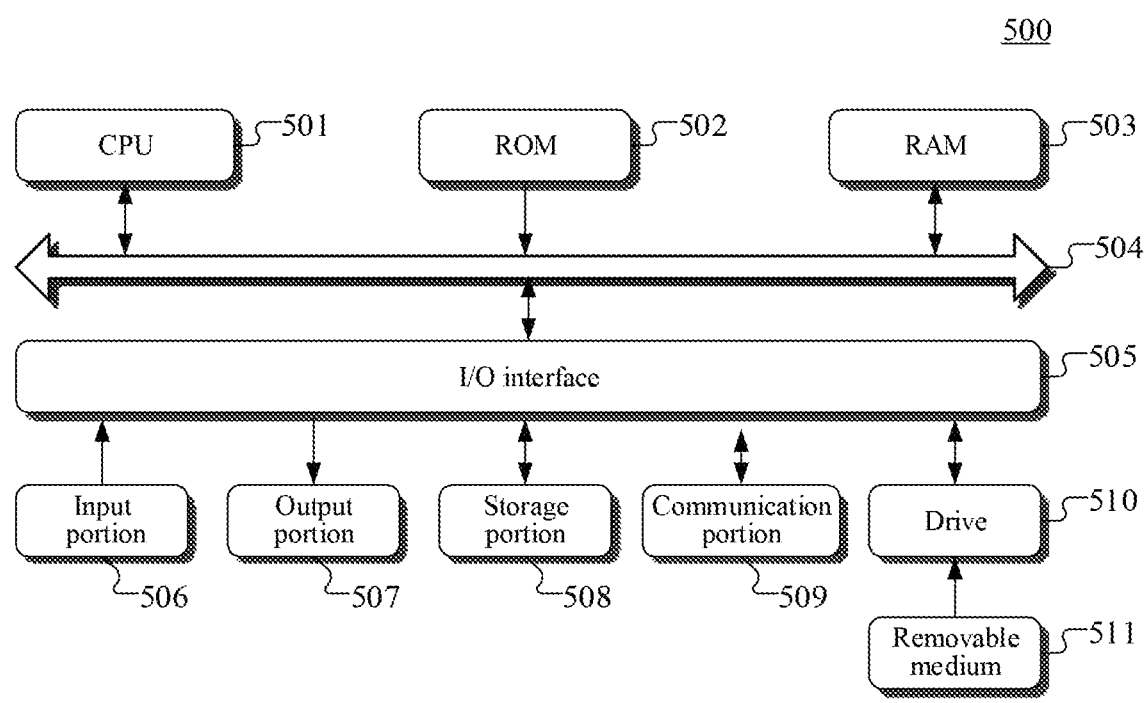
FIG. 5 is a schematic structural diagram of a computer system adapted to implement a standby terminal device according to the embodiments of the present disclosure.

Referring to FIG. 5, a schematic structural diagram of a computer system 500 adapted to implement a standby terminal device of the embodiments of the present disclosure is shown. The standby terminal device shown in FIG. 5 is merely an example, and should not bring any limitations to the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a touch screen, a touch panel, a human-computer interaction device etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first sending unit, and a second sending unit, where the names of these units do not in some cases constitute a limitation to such units or themselves. For example, the first sending unit may also be described as "a unit for periodically sending a heartbeat signal and/or communication data to the master control terminal device".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: periodically sending a heartbeat signal and/or communication data to the master control terminal device to determine whether the master control terminal device fails; and in response to determining a failure of the master control terminal device, acquiring data collected by the standby sensor, analyzing the data to generate a control instruction, and sending the generated control instruction to the electronic controller to enable the electronic controller to control the autonomous driving vehicle.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A system for controlling an autonomous driving vehicle, the system comprising: a master control terminal device inside the autonomous driving vehicle, a standby terminal device inside the autonomous driving vehicle and distinct from and coupled to the master control terminal device by a bus, an electronic controller in communication with the master control terminal device and with the standby terminal device, a main sensor and a standby sensor, the master control terminal device being responsible for overall intelligent control of the autonomous driving vehicle when the master control terminal device does not fail, and the standby control terminal device being responsible for the overall intelligent control of the autonomous driving vehicle when the master control terminal device fails;
    the master control terminal device processing data collected by the main sensor to generate a control instruction;
    the standby terminal device including a controller configured to periodically send over the bus a heartbeat signal and/or communication data to the master control terminal device to determine whether the master control terminal device fails based on a response or lack of response of the master control terminal device to the heartbeat signal and/or feedback of the master control terminal device to the communication data, and in response to determining a failure of the master control terminal device, acquire data collected by the standby sensor, and analyze the data to generate a standby control instruction; and
    the electronic controller being configured to execute the control instruction received from the master control terminal device to control the autonomous driving vehicle when the master control terminal device does not fail, and to execute, alternatively, the standby control instruction received from the standby terminal device when the master control device fails.

2. The system for controlling the autonomous driving vehicle according to claim 1, wherein
    the standby terminal device is configured to send a restart instruction to the master control terminal device after the generated standby control instruction is sent to the electronic controller to enable the electronic controller to control the autonomous driving vehicle, and to send an alarm message for prompting a driver to manually drive the autonomous driving vehicle in response to determining a failure of the restart of the master control terminal device.

3. The system for controlling the autonomous driving vehicle according to claim 2, wherein
    the standby terminal device switches the autonomous driving vehicle from an automatic driving mode to a manual driving mode in response to detecting a response of the driver to the alarm message after the alarm message for prompting the driver to manually drive the autonomous driving vehicle is sent.

4. The system for controlling the autonomous driving vehicle according to claim 2, wherein
    the standby terminal device sends a deceleration instruction or a pull-over instruction to the electronic controller in response to not detecting the response of the driver to the alarm message after the alarm message for prompting the driver to manually drive the autonomous driving vehicle is sent.

5. The system for controlling the autonomous driving vehicle according to claim 1, wherein the main sensor comprises a laser radar, a first millimeter wave radar and a first camera, and the standby sensor comprises a second millimeter wave radar and a second camera.

6. A method for controlling an autonomous driving vehicle, applied to a standby terminal device inside the autonomous driving vehicle, wherein the standby terminal device is in communication with a standby sensor, a master control terminal device and an electronic controller respectively, the master control terminal device is inside the autonomous driving vehicle and distinct from the standby terminal device, is coupled to the standby terminal device by a bus, and is in communication with a main sensor and with the electronic controller respectively, the master control terminal device is responsible for overall intelligent control of the autonomous driving vehicle when the master control terminal device does not fail, and the standby control terminal device is responsible for the overall intelligent control of the autonomous driving vehicle when the master control terminal device fails, the master control terminal device processes data collected by the main sensor to generate a control instruction, the electronic controller executes the control instruction to control the autonomous driving vehicle, and the method comprises:
    periodically sending by the standby terminal device a heartbeat signal and/or communication data over the bus to the master control terminal device to determine whether the master control terminal device fails based on a response or lack of response of the master control terminal device to the heartbeat signal and/or feedback of the master control terminal device to the communication data; and
    in response to determining a failure of the master control terminal device, acquiring data collected by the standby sensor, analyzing the data to generate a standby control instruction, and sending the standby control instruction to the electronic controller to enable the electronic controller to control the autonomous driving vehicle under command of the standby terminal device instead of the master control terminal device.

7. The method for controlling the autonomous driving vehicle according to claim 6, wherein after the sending the generated standby control instruction to the electronic controller to enable the electronic controller to control the autonomous driving vehicle, the method further comprises:
    sending a restart instruction to the master control terminal device; and sending an alarm message for prompting a driver to manually drive the autonomous driving vehicle in response to determining a failure of the restart of the master control terminal device.

8. The method for controlling the autonomous driving vehicle according to claim 7, wherein after the sending the alarm message for prompting the driver to manually drive the autonomous driving vehicle, the method further comprises:
switching the autonomous driving vehicle from an automatic driving mode to a manual driving mode in response to detecting a response of the driver to the alarm message.

9. The method for controlling the autonomous driving vehicle according to claim 7, wherein after the sending the alarm message for prompting the driver to manually drive the autonomous driving vehicle, the method further comprises:
sending a deceleration instruction or a pull-over instruction to the electronic controller in response to not detecting the response of the driver to the alarm message.

10. The method for controlling the autonomous driving vehicle according to claim 6, wherein the main sensor comprises a laser radar, a first millimeter wave radar and a first camera, and the standby sensor comprises a second millimeter wave radar and a second camera.

11. An apparatus for controlling an autonomous driving vehicle, applied to a standby terminal device inside the autonomous driving vehicle, wherein the standby terminal device is in communication with a standby sensor, a master control terminal device and an electronic controller respectively, the master control terminal device is inside the autonomous driving vehicle, is distinct from the standby terminal device and coupled to the standby terminal device by a bus, and is in communication with a main sensor and the electronic controller respectively, the master control terminal device is responsible for overall intelligent control of the autonomous driving vehicle when the master control terminal device does not fail, and the standby control terminal device is responsible for the overall intelligent control of the autonomous driving vehicle when the master control terminal device fails, the master control terminal device processes data collected by the main sensor to generate a control instruction, the electronic controller executes the control instruction to control the autonomous driving vehicle, and the standby terminal device comprises:
at least one processor; and
a memory storing instructions, the instructions when executed by the at least one processor, cause the at least one processor to perform operations, the operations comprising:
periodically sending over the bus a heartbeat signal and/or communication data to the master control terminal device to determine whether the master control terminal device fails based on a response or lack of response of the master control terminal device to the heartbeat signal and/or feedback of the master control terminal device to the communication data; and
in response to determining a failure of the master control terminal device, acquiring data collected by the standby sensor, analyzing the data to generate a standby control instruction, and sending the standby control instruction to the electronic controller to enable the electronic controller to control the autonomous driving vehicle under command of the standby terminal device instead of the master control terminal device.

12. The apparatus for controlling the autonomous driving vehicle according to claim 11, the operations further comprising:
sending a restart instruction to the master control terminal device; and
sending an alarm message for prompting a driver to manually drive the autonomous driving vehicle in response to determining a failure of the restart of the master control terminal device.

13. The apparatus for controlling the autonomous driving vehicle according to claim 12, the operations further comprising:
switching the autonomous driving vehicle from an automatic driving mode to a manual driving mode in response to detecting a response of the driver to the alarm message.

14. The apparatus for controlling the autonomous driving vehicle according to claim 12, the operations further comprising:
sending a deceleration instruction or a pull-over instruction to the electronic controller in response to not detecting the response of the driver to the alarm message.

15. The apparatus for controlling the autonomous driving vehicle according to claim 11, wherein the main sensor comprises a laser radar, a first millimeter wave radar and a first camera, and the standby sensor comprises a second millimeter wave radar and a second camera.

* * * * *